United States Patent [19]

Gilles

[11] 4,284,483

[45] Aug. 18, 1981

[54] HYDROXYL-TERMINATED LIQUID POLYMERS AND PROCESS FOR PREPARATION THEREOF USING A MIXTURE OF AT LEAST ONE HYDROXYL-CONTAINING DISULFIDE AND AT LEAST ONE HYDROXYL-CONTAINING TRISULFIDE

[75] Inventor: Jack C. Gilles, Shaker Heights, Ohio

[73] Assignee: The B.F. Goodrich Company, Akron, Ohio

[21] Appl. No.: 110,284

[22] Filed: Jan. 7, 1980

Related U.S. Application Data

[62] Division of Ser. No. 829,831, Sep. 1, 1977, Pat. No. 4,207,238.

[51] Int. Cl.$^3$ .............................................. B01J 19/12
[52] U.S. Cl. ................................................ 204/158 R
[58] Field of Search ........................ 204/158 T, 158 N

[56] References Cited

U.S. PATENT DOCUMENTS 4,120,766  10/1978  Riew .................................. 204/158 T

*Primary Examiner*—Howard S. Williams
*Attorney, Agent, or Firm*—J. Hughes Powell, Jr.

[57] ABSTRACT

Hydroxyl-terminated liquid polymers having an aliphatic polymeric backbone and sulfide linkages near the terminal portions of the polymer molecule are prepared by polymerizing (1) at least one vinylidene monomer having at least one terminal $CH_2=C<$ group per monomer molecule, together with (2) a mixture of at least one hydroxyl-containing disulfide and at least one hydroxyl-containing trisulfide. Use of the above disulfide-trisulfide mixture permits viscosity control during polymerization with substantially less disulfide required than if the disulfide alone were used, and the resulting polymers have less odor and discolor less upon heating than if the disulfide alone were used.

34 Claims, No Drawings

HYDROXYL-TERMINATED LIQUID POLYMERS AND PROCESS FOR PREPARATION THEREOF USING A MIXTURE OF AT LEAST ONE HYDROXYL-CONTAINING DISULFIDE AND AT LEAST ONE HYDROXYL-CONTAINING TRISULFIDE

CROSS REFERENCE TO RELATED APPLICATION

This is a division, of application Ser. No. 829,831, filed Sept. 1, 1977 now U.S. Pat. No. 4,207,238.

This application is related to U.S. patent application Ser. No. 782,104, filed Mar. 28, 1977, now U.S. Pat. No. 4,120,766.

BACKGROUND OF THE INVENTION

One-step thermal polymerization of styrene is known using a disulfide modifier in the presence of azobisisobutyronitrile initiator (Pierson et al, 17 *J. Polymer Science* 221–246, 1955). U.S. Pat. No. 3,470,146 discloses improved polystyrene beads produced by one-step thermal polymerization of styrene in the presence of a finely divided phosphate suspending agent, a water soluble sulfide or precursor, and certain water soluble organic sulfides. Neither of the above references discloses liquid polymers. Existing processes for production of hydroxyl-terminated liquid polymers are typically two-stage processes, e.g., the processes of U.S. Pat. Nos. 3,712,916 and 3,699,153. An improved one-step process is desired for production of hydroxyl-terminated liquid polymers using a hydroxyl-containing disulfide. Such an improved one-step process is desired in order to reduce expense of viscosity control during polymerization, and to reduce discoloration and odor upon heating of the resulting polymers.

SUMMARY OF THE INVENTION

Hydroxyl-terminated liquid polymers having an aliphatic polymeric backbone and sulfide linkages near the terminal portions of the polymer molecule are prepared by polymerizing (1) at least one vinylidene monomer having at least one terminal $CH_2=C<$ group per monomer molecule, together with (2) a mixture of at least one hydroxyl-containing disulfide and at least one hydroxyl-containing trisulfide.

DETAILED DESCRIPTION

Use of a mixture of at least one hydroxyl-containing disulfide and at least one hydroxyl-containing trisulfide makes viscosity control substantially easier and less expensive during a one-step polymerization reaction to form hydroxyl-terminated liquid polymers having an aliphatic polymeric backbone and sulfide linkages near the terminal portions of the polymeric molecule. In addition, the improved liquid polymers have less odor and discoloration upon heating than polymers made using only the hydroxyl-containing disulfide.

The hydroxyl-terminated liquid polymers produced by the process of this invention are believed to have the formula $$HO-X-(S)_k-(D)-(S)_k-X-OH$$

wherein k is 1 or 2; X is $(C_nH_{2n}O)_m(C_nH_{2n})_p$ or

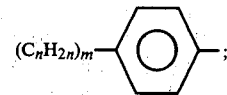

m is an integer from 0 to 10, more preferably from 0 to 4; n and p are integers from 1 to 10, more preferably from 1 to 4; and D is an aliphatic backbone containing polymerized units of at least one vinylidene monomer having at least one terminal $CH_2=C<$ group. The vinylidene monomer is selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

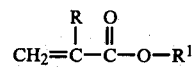

wherein R is hydrogen or an alkyl radical containing 1 to 3 carbon atoms, and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone.

More preferred liquid polymers contain polymerized units of at least one vinylidene monomer having at least one terminal $CH_2=C<$ group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

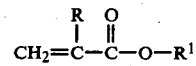

wherein R is hydrogen or an alkyl radical containing 1 to 3 carbon atoms, and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Excellent results were obtained with alkyl acrylates wherein the alkyl group contained 1 to 8 carbon atoms, including n-butyl acrylate and ethyl acrylate.

The vinylidene monomers described above may be polymerized readily with from 0% to about 40% by weight, more preferably from 0% to about 25% by weight, of at least one copolymerizable ethylenic monomer. Suitable comonomers include those selected from the group consisting of (f) vinyl aromatics having the formula

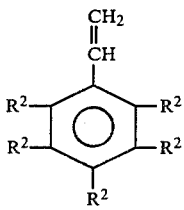

wherein $R^2$ is hydrogen, halogen or an alkyl radical containing 1 to 4 carbon atoms, such as styrene, α-methyl styrene, chlorostyrene, vinyl toluene, and the like; (g) vinyl nitriles having the formula

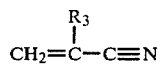

wherein $R^3$ is hydrogen or an alkyl radical containing 1 to 3 carbon atoms, such as acrylonitrile, methacrylonitrile and the like; (h) divinyls and diacrylates such as divinyl benzene, divinyl ether, diethylene glycol diacrylate, and the like; (i) amides of α,β-olefinically unsaturated carboxylic acids containing 2 to 8 carbon atoms such as acrylamide and the like; (j) hydroxyl-containing vinylidene monomers for the purpose of including some random hydroxyl functionality, for example allyl alcohol, vinyl benzyl alcohol, and hydroxyl-containing esters of acrylic acid such as 2-hydroxyethyl acrylate and the like; and (k) other vinylidene monomers such as bis(β-chloroethyl) vinyl phosphonate, N-vinyl-2-pyrrolidone, diacetone acrylamide, and the like. Liquid polymer compositions comprising polymerized units of a major amount of at least one vinylidene monomer listed in (a) to (e) with a minor amount of at least one comonomer listed in (f) to (k) are within the scope of this invention.

More preferred comonomers may be selected from the group consisting of (f) vinyl aromatics having the formula

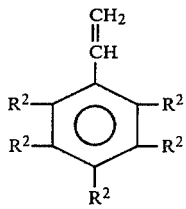

wherein $R^2$ is hydrogen, halogen or an alkyl or hydroxyalkyl radical containing 1 to 4 carbon atoms; (g) nitriles having the formula

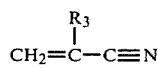

wherein $R^3$ is hydrogen or an alkyl radical containing 1 to 3 carbon atoms; (j) hydroxyl-containing vinylidene monomers for the purpose of including some random hydroxyl functionality; and (k) N-vinyl-2-pyrrolidone and diacetone acrylamide. Excellent results were obtained using acrylonitrile, 2-hydroxyethyl acrylate, N-vinyl-2-pyrrolidone and diacetone acrylamide.

Examples of useful polymeric backbones in the hydroxylated liquid alkyl acrylate polymers include poly(n-butyl acrylate/N-vinyl-2-pyrrolidone/butadiene/acrylic acid), wherein the acrylic acid moiety is hydroxylated after polymerization using ethylene oxide or the like to provide random hydroxyl group(s) in a backbone unit equivalent to 2-hydroxyethyl acrylate. Also suitable are poly(n-butyl acrylate/N-vinyl-2-pyrrolidone/2-hydroxyethyl acrylate), poly(n-butyl acrylate/ethyl acrylate/N-vinyl-2-pyrrolidone/2-hydroxyethyl acrylate), poly(n-butyl acrylate/butadiene/N-vinyl-2-pyrrolidone/2-hydroxyethyl acrylate), and poly (n-butyl acrylate/ethyl acrylate/acrylonitrile/2-hydroxyethyl acrylate). In the latter four backbones, random hydroxylation is provided using 2-hydroxyethyl acrylate. Of course, each polymer backbone has terminal hydroxyl functionality provided by the hydroxyl-containing disulfide and hydroxyl-containing trisulfide as described heretofore.

Hydroxyl-containing disulfides and trisulfides suitable for use in the process of this invention have the formulas

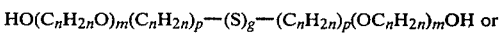

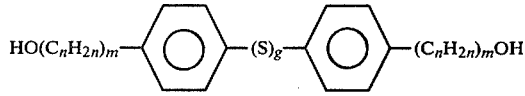

wherein n, m and p are as defined heretofore, and g is 2 or 3 (disulfide or trisulfide). Examples of suitable hydroxyl-containing disulfides and trisulfides include 2-hydroxyethyl disulfide, 2-hydroxyethyl trisulfide, 3-hydroxypropyl disulfide, 3-hydroxypropyl trisulfide and the like. The disulfide and trisulfide act both as polymerization initiators and as polymerization modifiers. The amount of disulfide-trisulfide mixture will vary according to the desired polymeric molecular weight but typically is from about 1 to 20 weight percent, more preferably from 1 to 10 weight percent, based upon total monomeric weight. The hydroxyl-containing trisulfide typically constitutes from about 1 to about 25 weight percent of the disulfide-trisulfide mixture, more preferably from about 2 to about 10 wt.% of the disulfide-trisulfide mixture. Excellent results were obtained using a mixture of about 95 wt.% 2-hydroxyethyl disulfide and 5 wt.% 2-hydroxyethyl trisulfide.

Thermal polymerization or photopolymerization may be used for the polymerization process of this invention, with thermal polymerization being preferred. The polymerization may be conducted by any method known to the art, including bulk, solution, suspension and emulsion methods. Solvents for the monomer and/or polymer can be used during polymerization, including benzene, aliphatic hydrocarbons such as hexane and heptane, and alcohols such as methanol, ethanol, t-butanol, and the like. Well known suspension techniques comprise suspending the monomeric material, preferably already mixed with the hydroxyl-containing disulfide and trisulfide, in the form of small particles in a nonsolvent liquid such as water, together with a suspending agent to aid in maintaining the particles separate from one another during polymerization. Suitable suspending agents include starch, carboxymethylcellulose, and the like. Emulsion polymerization is similar, except that emulsifiers are used to produce much smaller particles, and the end product is a stable aqueous emulsion of the polymer. Suitable emulsifiers include sodium or potassium fatty acid soaps, sodium alkaryl sulfonates, and the like.

Thermal polymerization typically is conducted with stirring at about 80°–90° C., with cooling provided if necessary. On the other hand, photopolymerization may be conducted in the presence of radiation at wavelengths from about 1,850 Å to about 6,000 Å, more preferably from about 2,400 Å to about 4,000 Å. Common sources of such radiation include mercury lamps and arcs, carbon arcs and hydrogen discharge tubes. The vessel in which the photopolymerization is conducted may be transparent to light of the desired wavelength, with the light source located external to the vessel so that light can pass through the sides of the vessel. Suitable glasses are available commercially and include borosilicates ("Pyrex"), "Vycor" or soft glass. Alternatively, the light source may be placed within the reaction vessel, either directly above the surface of the reaction mixture or within the mass of the reaction mixture. In some cases a sensitizer may be useful in catalytic amounts to accelerate the photopolymerization, including ketones such as acetone, benzophenone and the like.

Air or oxygen has an inhibiting effect upon the polymerization and preferably is excluded from the reaction vessel. Therefore, the reaction vessel desirably is flushed with nitrogen before the vessel is charged, and a nitrogen purge may be continued if necessary to exclude air during polymerization. The polymerization rate may be monitored by withdrawing reaction mixture samples at periodic intervals for percent conversion analysis. The reaction can be run to 100% conversion, but it generally is more economical to run to about 70–98% conversion and recover unreacted monomer for reuse. The hydroxyl-containing liquid polymer may be purified by vacuum distillation or by washing with water in order to remove the unreacted hydroxyl-containing disulfide and trisulfide, followed by drying the polymer. The structure of the hydroxyl-containing liquid polymer can be confirmed by infrared analysis, together with well known wet chemical methods for determination of hydroxyl and sulfur content. Number average molecular weights ($\overline{M}_n$) of the hydroxylated liquid polymers may range from about 1,000 to about 6,000, more preferably from about 2,000 to about 4,000, as measured using cryoscopic, ebullioscopic or osmometric methods. The hydroxylated liquid alkyl acrylate polymers typically have Brookfield viscosities at 25° C. from about 50,000 cps. to about 2,000,000 cps., more preferably from about 200,000 cps. to about 1,000,000 cps.

The following examples illustrate the present invention more fully.

EXAMPLES

Examples 1 to 4 demonstrate that a combination of 2-hydroxyethyl disulfide with a small amount of 2-hydroxy-ethyltrisulfide is much more effective for polymer viscosity control than 2-hydroxyethyl disulfide alone. A smaller amount of a mixture of the disulfide and trisulfide can be used to achieve a given viscosity than if the disulfide alone were used. Compare example 1 (lower viscosity using a disulfide-trisulfide mixture) with example 2 (higher viscosity using disulfide alone). Also compare example 3 (lower viscosity using a disulfide-trisulfide mixture) with example 4 (higher viscosity using disulfide alone). Examples 5 to 9 also demonstrate that consistently lower viscosities are achieved when a mixture of 2-hydroxyethyl disulfide and 2-hydroxyethyl trisulfide is used. In all examples the product was a random- and terminal-hydroxylated polymer.

Example 1—Random- and terminal-hydroxylated liquid polymer made using a mixture of 2-hydroxyethyl disulfide and 2-hydroxyethyl trisulfide By way of illustration, a random- and terminal-hydroxylated liquid polymer was prepared using the following recipe:

| Material | Parts | Wt. (grams) |
| --- | --- | --- |
| n-Butyl Acrylate | 85 | 255 |
| Ethyl Acrylate | 10 | 30 |
| N-vinyl-2-Pyrrolidone | 5 | 15 |
| 2-Hydroxyethyl Acrylate | 2 | 6 |
| Azoisobutyronitrile | 0.2 | 0.6 |
| Disulfide-Trisulfide Mixture* | 8 | 24 |
| t-Butanol | 100 | 300 |
| | 210.2 | 630.6 |

*Mixture contained 95 wt. % 2-hydroxyethyl disulfide and 5 wt. % 2-hydroxyethyl trisulfide.

A 1,000 ml flask was equipped with an air stirrer, thermometer, condenser, tube for nitrogen blanketing, and heating mantle. Recipe materials were charged to the flask, which was purged with nitrogen throughout the charging and reaction procedure. Reactor contents were heated to 80°–85° C. and maintained at that temperature for 45 minutes. The reaction mixture was cooled to 55° C. and an additional 0.6 gram of azoisobutyronitrile was charged, after which the reactants were reheated to 85° C. for one hour. Percent conversion was found to be 69%. The reaction mixture was then transferred to a 1,000 ml round-bottom flask and rotoevaporated under vacuum using a 70° C. hot water bath to remove solvent and unreacted monomers. The product was a slightly off-white, liquid poly(n-butyl acrylate/ethyl acrylate/N-vinyl-2-pyrrolidone/2-hydroxyethyl acrylate) having both random hydroxyl groups (supplied by 2-hydroxyethyl acrylate) and terminal hydroxyl groups (supplied by the mixture of 2-hydroxyethyl disulfide and 2-hydroxyethyl trisulfide).

The example 1 polymer had a Brookfield viscosity at 25° C. of about 600,000 cps. Such a low viscosity, compared with the example 2 polymer, demonstrates the greater effectiveness of a disulfide-trisulfide mixture (example 1) compared with disulfide alone (example 2) in controlling viscosity of the hydroxyl-terminated liquid polymers produced.

Example 2—Random- and terminal-hydroxylated polymer made using 2-hydroxyethyl disulfide For comparison purposes, a polymer was made using the same equipment and recipe as in example 1 except that 2-hydroxyethyl disulfide alone was used in an amount equal to the weight of the mixture of 2-hydroxyethyl disulfide and 2-hydroxyethyl trisulfide in example 1. Total reaction time was about one-half hour, compared to close to two hours for the example 1 reaction. Moreover, only 0.6 gram azoisobutyronitrile initiator was used, compared to 1.2 grams azoisobutyronitrile initiator for the example 1 reaction. The example 2 polymer was a poly(n-butyl acrylate/ethyl acrylate/N-vinyl-2-pyrrolidone/2-hydroxyethyl acrylate) having both random hydroxyl groups (provided by 2-hydroxyethyl acrylate) and terminal hydroxyl groups (provided by 2-hydroxyethyl disulfide).

The example 2 polymer had a Brookfield viscosity at 25° C. of about 8,000,000 cps., i.e., more than ten times that of the example 1 polymer. Example 2 viscosity was higher in spite of the fact that initiator amount and reaction time were both less than in example 1. These results indicate that the presence of a small amount of 2-hydroxyethyl trisulfide (together with 2-hydroxyethyl disulfide) is surprisingly effective in controlling polymer viscosity.

Examples 3 and 4

Examples 3 and 4 correspond to examples 1 and 2 respectively, except that acrylonitrile was used in place of N-vinyl 2-pyrrolidone. The same general polymerization method was used in examples 3 and 4 as in example 1. The example 4 polymer was found to have a Brookfield viscosity more than ten times that of the example 3 polymer, even though more azoisobutyronitrile was used in Example 3. This indicates that the presence of a small amount of 2-hydroxyethyl trisulfide (together with 2-hydroxyethyl disulfide) during the example 3 polymerization was much more effective for viscosity control than use of 2-hydroxyethyl disulfide alone in example 4.

Test data for examples 1 to 4 is set forth in Table I.

Examples 5 to 9

Polymers in examples 5 to 9 were prepared by the general thermal polymerization method of examples 1 to 4. Examples 5 to 7 demonstrate consistently lower viscosities using a mixture of 2-hydroxyethyl disulfide and 2-hydroxyethyl trisulfide compared to examples 8 and 9. In the latter two examples larger amounts of 2-hydroxyethyl disulfide alone are used than in examples 5 to 7, yet Brookfield viscosities are much higher—4,800,000 cps. and 8,000,000 cps. for examples 8 and 9 respectively.

Test data for examples 5 to 9 is set forth in Table II.

TABLE II

| Example | 5 | 6 | 7 | 8 | 9 |
|---|---|---|---|---|---|
| Recipe Used in Preparing Terminal- and Random-Hydroxylated Liquid Polymer (Wt. Parts) | | | | | |
| n-Butyl Acrylate | 93 | 93 | 85 | 85 | 85 |
| Ethyl Acrylate | — | — | 10 | 15 | 10 |
| N-Vinyl-2-Pyrrolidone | 5 | 5 | 4 | 5 | — |
| Acrylonitrile | — | — | — | — | 5 |
| 2-Hydroxyethyl Acrylate | 2 | 2 | 2 | 2 | 2 |
| Azoisobutyronitrile | 0.4 | 0.4 | 0.2 | 0.2 | 0.2 |
| Disulfide-Trisulfide Mixture* | 6 | 3 | 5 | — | — |
| 2-Hydroxyethyl Disulfide | — | — | — | 8 | 10 |
| t-Butanol | 100 | 100 | 100 | 100 | 100 |
| Brookfield Viscosity at 25° C. (cps.) | 300,000 | 930,000 | 384,000 | 4,800,000 | 8,000,000 |

*Mixture contained 95 wt. % 2-hydroxyethyl disulfide and 5 wt. % 2-hydroxyethyl trisulfide.

The process of the present invention is used to prepare hydroxyl-terminated liquid polymers having an aliphatic polymeric backbone and sulfide linkages near the terminal portions of the polymer molecule. Use of a small amount of a defined hydroxyl-containing trisulfide during polymerization permits use of substantially less hydroxyl-containing disulfide to achieve a given viscosity than was heretofore possible, making viscosity control both easier and less expensive. Furthermore, use of a lesser amount of hydroxyl-containing disulfide results in polymers that discolor less and have less odor upon heating in subsequent reactions with other materials to form polyurethanes, etc.

The hydroxyl-terminated polymeric products of the process of this invention may be used wherever hydroxylated liquid polymers are useful in ways known in the art, for example as epoxy resin tougheners, and in the preparation of polyurethanes useful as adhesives, caulks and the like.

TABLE I

| Example | 1 | 2 | 3 | 4 |
|---|---|---|---|---|
| Recipe Used in Preparing Terminal- and Random-Hydroxylated Liquid Polymer (Wt. Parts) | | | | |
| n-Butyl Acrylate | 85 | 85 | 85 | 85 |
| Ethyl Acrylate | 10 | 10 | 10 | 10 |
| N-Vinyl-2-Pyrrolidone | 5 | 5 | — | — |
| Acrylonitrile | — | — | 5 | 5 |
| 2-Hydroxyethyl Acrylate | 2 | 2 | 2 | 2 |
| Azoisobutyronitrile | 0.4 | 0.2 | 0.4 | 0.2 |
| Disulfide-Trisulfide Mixture* | 8 | — | 8 | — |
| 2-Hydroxyethyl Disulfide | — | 8 | — | 8 |
| t-Butanol | 100 | 100 | 100 | 100 |
| Brookfield Viscosity at 25° C. (cps.) | 600,000 | 8,000,000 | 700,000 | 8,000,000 |

*Mixture contained 95 wt. % 2-hydroxyethyl disulfide and 5 wt. % 2-hydroxyethyl trisulfide

I claim:
1. A process for preparing a hydroxyl-terminated liquid polymer having an aliphatic polymeric backbone, said process comprising photo-polymerizing
   (1) at least one vinylidene monomer having at least one terminal $CH_2=C<$ group, together with
   (2) at least one hydroxyl-containing disulfide having the formula

$HO(C_nH_{2n}O)_m(C_nH_{2n})_p-(S)_g-(C_nH_{2n})_p(OC_nH_{2n})_mOH$ or

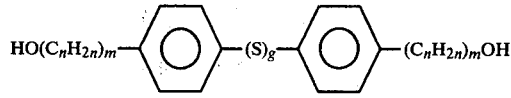

wherein m is an integer from 0 to 10, n and p are integers from 1 to 10, and g is 2, and
   (3) at least one hydroxyl-containing trisulfide having the formulas above, except that g is 3, the amount of said trisulfide constituting from about 1 wt.% to about 25 wt.% of the total amount of said trisulfide and disulfide, wherein
   (4) said vinylidene monomer is selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

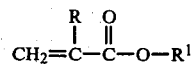

said R being hydrogen or an alkyl radical containing 1 to 3 carbon atoms, and $R^1$ being hydrogen or an alkyl radical containing 1 to 18 carbon atoms, or an alkoxyalkyl, alkylthioalkyl or cyanoalkyl radical containing 2 to 12 carbon atoms.

2. A process of claim 1 wherein m is an integer from 0 to 4, n and p are integers from 1 to 4, and said vinylidene monomer is selected from the group consisting of (a) monoolefins containing 2 to 8 carbon atoms, (b) dienes containing 4 to 8 carbon atoms, and (e) acrylic acids and acrylates having the formula

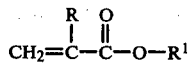

said R being hydrogen or an alkyl radical containing 1 to 3 carbon atoms, and said $R^1$ being hydrogen, an alkyl radical containing 1 to 8 carbon atoms, or an alkoxyalkyl, alkylthioalkyl or cyanoalkyl radical containing 2 to 8 carbon atoms.

3. A process of claim 2 wherein said hydroxyl-containing disulfide and trisulfide have the formula $HO(C_nH_{2n}O)_m(C_nH_{2n})_p-(S)_g-(C_nH_{2n})_p(OC_nH_{2n})_mOH$ wherein m is an integer from 0 to 4, n and p are integers from 1 to 4, and g is 2 and 3 for the disulfide and trisulfide respectively.

4. A process of claim 3 wherein said vinylidene monomer has copolymerized therewith from 0 to about 40 wt.% of at least one copolymerizable ethylenic monomer.

5. A process of claim 4 wherein said copolymerizable ethylenic monomer is selected from the group consisting of (f) vinyl aromatics having the formula

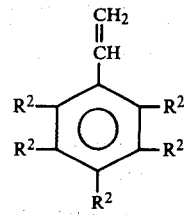

wherein $R^2$ is hydrogen, halogen or an alkyl radical containing 1 to 4 carbon atoms, (g) vinyl nitriles having the formula

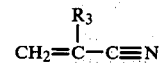

wherein $R^3$ is hydrogen or an alkyl radical containing 1 to 3 carbon atoms (h) divinyls and diacrylates, (i) amides of $\alpha,\beta$-olefinically unsaturated carboxylic acids containing 2 to 8 carbon atoms, (j) hydroxyl-containing vinylidene monomers, and (k) N-vinyl-2-pyrrolidone and diacetone acrylamide.

6. A process of claim 5 wherein said vinylidene monomer is selected from the group consisting of n-butyl acrylate, ethyl acrylate and butadiene, and said ethylenic comonomer is selected from the group consisting of acrylonitrile, N-vinyl-2-pyrrolidone, diacetone acrylamide and hydroxyl-containing esters of acrylic acid.

7. A process of claim 6 wherein said hydroxyl-containing disulfide and trisulfide are 2-hydroxyethyl disulfide and 2-hydroxyethyl trisulfide respectively.

8. A process of claim 7 wherein the backbone of said alkyl acrylate liquid polymer contains polymerized therein n-butyl acrylate, butadiene, N-vinyl-2-pyrrolidone and a hydroxyl-containing ester of acrylic acid.

9. A process of claim 8 wherein said hydroxyl-containing ester of acrylic acid is 2-hydroxyethyl acrylate.

10. A process of claim 7 wherein the backbone of said alkyl acrylate liquid polymer contains polymerized therein n-butyl acrylate, N-vinyl-2-pyrrolidone and a hydroxyl-containing ester of acrylic acid.

11. A process of claim 10 wherein said hydroxyl-containing ester of acrylic acid is 2-hydroxyethyl acrylate.

12. A process of claim 7 wherein the backbone of said alkyl acrylate liquid polymer contains polymerized therein n-butyl acrylate, ethyl acrylate, N-vinyl-2-pyrrolidone, and a hydroxyl-containing ester of acrylic acid.

13. A process of claim 12 wherein said hydroxyl-containing ester of acrylic acid is 2-hydroxyethyl acrylate.

14. A process of claim 7 wherein the backbone of said alkyl acrylate liquid polymer contains polymerized therein n-butyl acrylate, acrylonitrile, N-vinyl-2-pyrrolidone, and a hydroxyl-containing ester of acrylic acid.

15. A process of claim 14 wherein said hydroxyl-containing ester of acrylic acid is 2-hydroxyethyl acrylate.

16. A process of claim 7 wherein the backbone of said alkyl acrylate liquid polymer contains polymerized therein n-butyl acrylate, ethyl acrylate, acrylonitrile and a hydroxyl-containing ester of acrylate acid.

17. A process of claim 16 wherein said hydroxyl-containing ester of acrylic acid is 2-hydroxyethyl acrylate.

18. A product of a process for preparing a hydroxyl-terminated liquid polymer having an aliphatic polymeric backbone, said process comprising photo polymerizing
   (1) at least one vinylidene monomer having at least one terminal CH$_2$=C< group, together with
   (2) at least one hydroxyl-containing disulfide having the formula

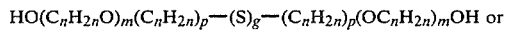

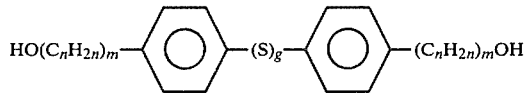

wherein m is an integer from 0 to 10, n and p are integers from 1 to 10, and g is 2, and
   (3) at least one hydroxyl-containing trisulfide having the formula above, except that g is 3, the amount of said trisulfide constituting from about 1 wt.% to about 25 wt.% of the total amount of said trisulfide and disulfide, wherein
   (4) said vinylidene monomer is selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

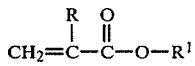

said R being hydrogen or an alkyl radical containing 1 to 3 carbon atoms, and R$^1$ being hydrogen or an alkyl radical containing 1 to 18 carbon atoms, or an alkoxyalkyl, alkylthioalkyl or cyanoalkyl radical containing 2 to 12 carbon atoms.

19. A product of a process of claim 18 wherein m is an integer from 0 to 4, n and p are integers from 1 to 4, and said vinylidene monomer is selected from the group consisting of (a) monoolefins containing 2 to 8 carbon atoms, (b) dienes containing 4 to 8 carbon atoms, and (e) acrylic acids and acrylates having the formula

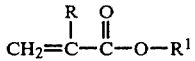

said R being hydrogen or an alkyl radical containing 1 to 3 carbon atoms, and said R$^1$ being hydrogen, an alkyl radical containing 1 to 8 carbon atoms, or an alkoxyalkyl, alkylthioalkyl or cyanoalkyl radical containing 2 to 8 carbon atoms.

20. A product of a process of claim 19 wherein said hydroxyl-containing disulfide and trisulfide have the formula

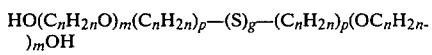

wherein m is an integer from 0 to 4, n and p are integers from 1 to 4, and g is 2 and 3 for the disulfide and trisulfide respectively.

21. A product of a process of claim 20 wherein said vinylidene monomer has copolymerized therewith from 0 about 40 wt.% of at least one copolymerizable ethylenic monomer.

22. A product of a process of claim 21 wherein said copolymerizable ethylenic monomer is selected from the group consisting of (f) vinyl aromatics having the formula

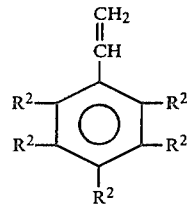

wherein R$^2$ is hydrogen, halogen or an alkyl radical containing 1 to 4 carbon atoms, (g) vinyl nitriles having the formula

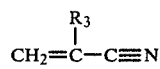

wherein R$^3$ is hydrogen or an alkyl radical containing 1 to 3 carbon atoms, (h) divinyls and diacrylates, (i) amides of α,β-olefinically unsaturated carboxylic acids containing 2 to 8 carbon atoms, (j) hydroxyl-containing vinylidene monomers, and (k) N-vinyl-2-pyrrolidone and diacetone acrylamide.

23. A product of a process of claim 22 wherein said vinylidene monomer is selected from the group consisting of n-butyl acrylate, ethyl acrylate and butadiene, and said ethylenic comonomer is selected from the group consisting of acrylonitrile, N-vinyl-2-pyrrolidone, diacetone acrylamide and hydroxyl-containing esters of acrylic acid.

24. A product of a process of claim 23 wherein said hydroxyl-containing disulfide and trisulfide are 2-hydroxyethyl disulfide and 2-hydroxyethyl trisulfide respectively.

25. A product of a process of claim 24 wherein the backbone of said alkyl acrylate liquid polymer contains polymerized therein n-butyl acrylate, butadiene, N-vinyl-2-pyrrolidone and a hydroxyl-containing ester of acrylic acid.

26. A product of a process of claim 25 wherein said hydroxyl-containing ester of acrylic acid is 2-hydroxyethyl acrylate.

27. A product of a process of claim 24 wherein the backbone of said alkyl acrylate liquid polymer contains polymerized therein n-butyl acrylate, N-vinyl-2-pyrrolidone and a hydroxyl-containing ester of acrylic acid.

28. A product of a process of claim 27 wherein said hydroxyl-containing ester of acrylic acid is 2-hydroxyethyl acrylate.

29. A product of a process of claim 24 wherein the backbone of said alkyl acrylate liquid polymer contains polymerized therein n-butyl acrylate, ethyl acrylate, N-vinyl-2-pyrrolidone, and a hydroxyl-containing ester of acrylic acid.

30. A product of a process of claim 29 wherein said hydroxyl-containing ester of acrylic acid is 2-hydroxyethyl acrylate.

31. A product of a process of claim 24 wherein the backbone of said alkyl acrylate liquid polymer contains polymerized therein n-butyl acrylate, acrylonitrile, N- vinyl-2-pyrrolidone, and a hydroxyl-containing ester of acrylic acid.

32. A product of a process of claim 31 wherein said hydroxyl-containing ester of acrylic acid is 2-hydroxyethyl acrylate.

33. A product of a process of claim 24 wherein the backbone of said alkyl acrylate liquid polymer contains polymerized therein n-butyl acrylate, ethyl acrylate, acrylonitrile and a hydroxyl-containing ester of acrylic acid.

34. A product of a process of claim 33 wherein said hydroxyl-containing ester of acrylic acid is 2-hydroxyethyl acrylate.

* * * * *